Figure 1:
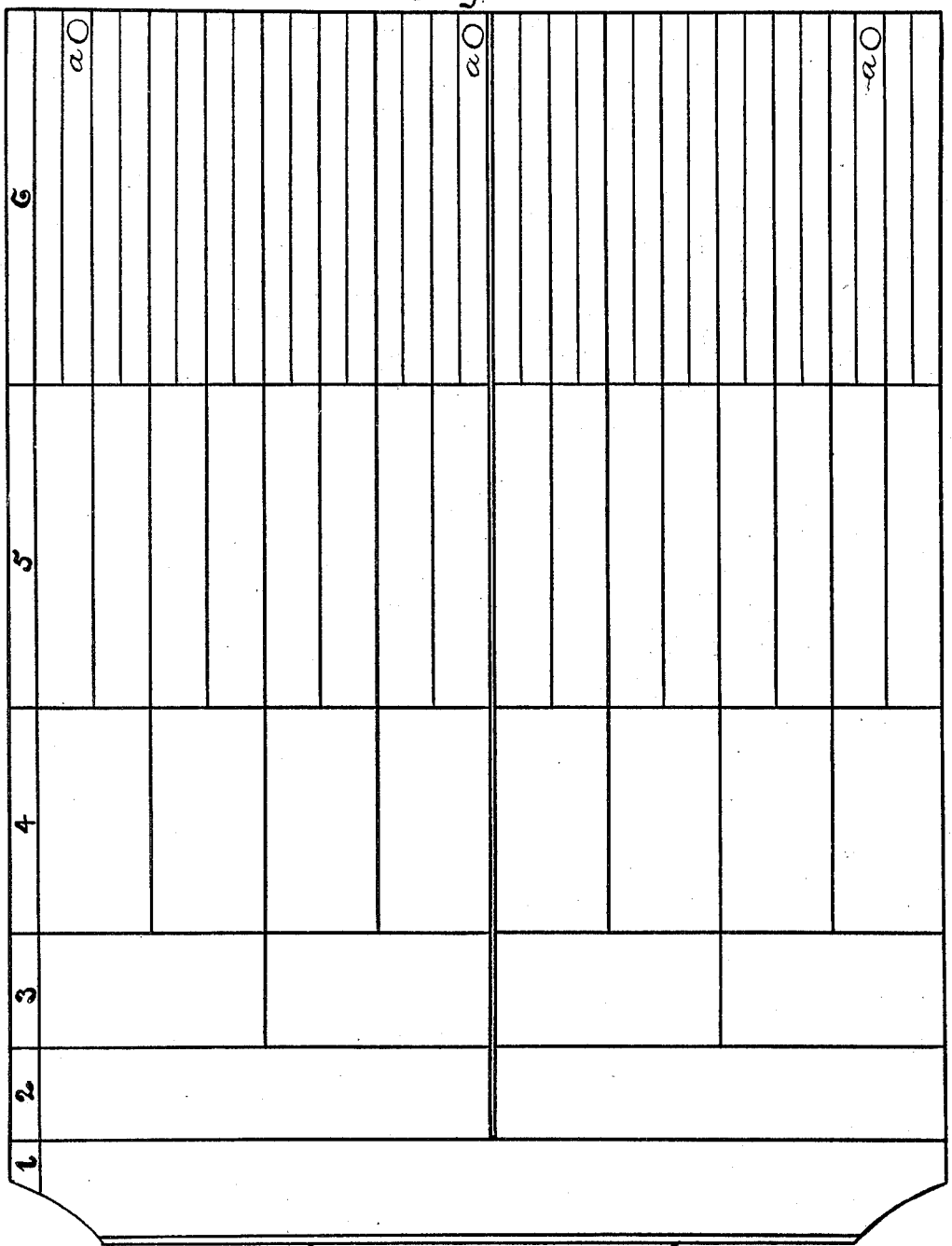

No. 699,799. Patented May 13, 1902.
G. GUILD.
CHART FOR RECORDING ANCESTRY.
(Application filed Dec. 21, 1900.)
(No Model.) 6 Sheets—Sheet I.

Witnesses. Inventor.
Leonard W. Horton. Georgiana Guild
Henry M. Bro. Jr per
Attorney.

No. 699,799. Patented May 13, 1902.
G. GUILD.
CHART FOR RECORDING ANCESTRY.
(Application filed Dec. 21, 1900.)
(No Model.) 6 Sheets—Sheet 2.

Fig. 2.

No. 699,799. Patented May 13, 1902.
G. GUILD.
CHART FOR RECORDING ANCESTRY.
(Application filed Dec. 21, 1900.)
(No Model.) 6 Sheets—Sheet 3.

Fig.3.

Witnesses. B No.1. Inventor.
Leonard W. Horton, Georgiana Guild
Henry M. Boss Jr per Milton P. Vincent
Attorney.

No. 699,799. Patented May 13, 1902.
G. GUILD.
CHART FOR RECORDING ANCESTRY.
(Application filed Dec. 21, 1900.)

(No Model.) 6 Sheets—Sheet 4.

Fig. 4.

No. 699,799. Patented May 13, 1902.
G. GUILD.
CHART FOR RECORDING ANCESTRY.
(Application filed Dec. 21, 1900.)

(No Model.) 6 Sheets—Sheet 5.

Fig. 5.

B No. 1. B No. 2.

Witnesses.
Leonard W. Horton
Henry M. Box Jr

Inventor. Georgiana Guild
per Walter B. Vincent
Attorney.

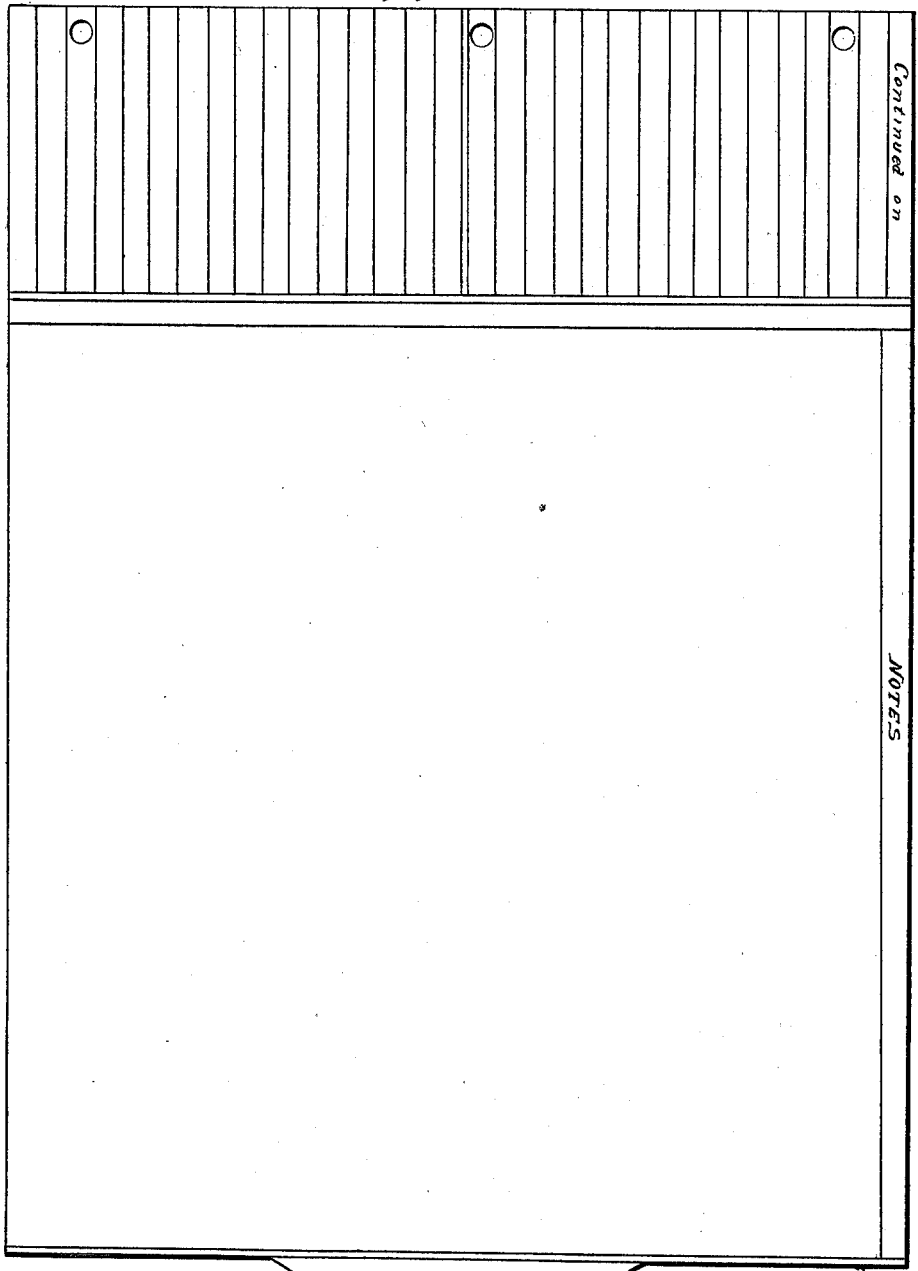

UNITED STATES PATENT OFFICE.

GEORGIANA GUILD, OF PROVIDENCE, RHODE ISLAND.

CHART FOR RECORDING ANCESTRY.

SPECIFICATION forming part of Letters Patent No. 699,799, dated May 13, 1902.

Application filed December 21, 1900. Serial No. 40,700. (No model.)

*To all whom it may concern:*

Be it known that I, GEORGIANA GUILD, a citizen of the United States, residing at Providence, in the county of Providence and State of Rhode Island, have invented a new and useful Chart for Recording Ancestry; and I do hereby declare that the following specification, taken in connection with the drawings making a part of the same, is a full, clear, and exact description thereof.

This invention relates to certain improvements in means for recording pedigrees or ancestry, and has for its object to facilitate the preparation and reading of ancestral charts or "family trees."

With this object in view the invention consists in the improved charts and method of preparing the same, which will be hereinafter fully described and afterward specifically claimed.

In the accompanying drawings, which illustrate charts embodying my invention, Figure 1 is a plan view of a chart for registering ancestors to the sixth generation designated chart "A." Fig. 2 is a similar view of the back of the chart shown in Fig. 3. Fig. 3 is a plan view of one of the series known as "B" charts. Fig. 4 is a plan view of a modified form of A chart; Fig. 5, a similar view of a modified B chart. Fig. 6 represents a plan view of the reverse side of one of the secondary charts without the employment of reference letters and numerals.

Referring more particularly to the drawings, A in Figs. 1 and 4 on a projection at one end of the chart indicates the general class to which the chart belongs, as does B, similarly applied to the charts illustrated in Figs. 3 and 5. Of such general classes composing a complete chart there are illustrated only two, although their numbers might be increased according to the number of generations to be recorded.

Each complete chart will begin with one of class A, as shown in Fig. 1, which chart is ruled to form one space, headed "1," for the record of the individual whose ancestry is to be recorded in the chart; two spaces to the right of space "1," headed "2," to receive the names of the parents; four spaces to the right of the spaces "2," headed "3," to record the grandparents or the third generation; eight spaces, headed "4," to the right of spaces "3," to record the fourth generation; sixteen spaces, headed "5," to the right of spaces "4" to record the fifth generation; and thirty-two spaces, headed "6," to the right of spaces "5" to record the sixth generation.

For continuing the record farther back I provide the B charts, as shown in Fig. 3, which are ruled the same as the A charts, the spaces being headed from the left to the right consecutively with the numbers "6," "7," "8," "9," "10," and "11" to indicate the generation of the persons recorded in each space. In space "6" of each B chart is recorded one person from one of the six spaces of the A chart, so that to continue the record beyond the sixth generation as many B charts are required as there are names in the six spaces of A chart, which if the chart A is filled is thirty-two, so that one primary or A chart and thirty-two secondary or B charts are required to complete the record to include the eleventh generation.

The B charts are printed in blue, except the marginal numbers "6" to "11," which are in red, the same as the marginal numbers in the A charts.

On the back of chart B No. 1 an index is printed, as shown in Fig. 2, which contains at its left-hand end a row of spaces, thirty-two in number, corresponding with the six spaces of chart A, and consequently with the total number of B charts. When the charts A and B are temporarily bound by pins or ribbons passed through eyelet-holes *a a a*, as shown in all of the figures, the spaces to the left of index of Fig. 2 will face the corresponding six spaces of chart A and in each space of the index will be transcribed the name from the corresponding space of chart A, such index-spaces being marked in blue "B No. 1," "B No. 2," &c., to indicate that the name in each respective space is to occupy the "6" space in the B chart of like number.

In Fig. 4 I show an index similar to that shown in Fig. 2 printed in the spaces under the heading "6," thus dispensing with the printing of the index on the back of chart "B No. 1."

In Fig. 5 I show how two secondary charts may be printed on one sheet, headed "B No. 1" and "B No. 2," respectively.

An index, as shown in Fig. 6, is printed on the back of all the secondary or B charts except "B No. 1," but without reference letters and numbers in the spaces. These when bound face each B chart, continuing the spaces of the eleventh generation. These blank spaces are intended for the dates of the eleventh generation.

Having thus fully described my invention, what I claim as new, and desire to secure by Letters Patent of the United States, is—

1. An improved ancestry-record, comprising a primary chart provided with a plurality of series of spaces the number of spaces in the different series increasing in geometrical progression from left to right and said series marked consecutively by numerals increasing in arithmetical progression from left to right to indicate the generation to be recorded in each series, and a series of secondary charts in number corresponding to the number of spaces in the right-hand series of the primary chart, the secondary charts having spaces arranged the same as in the primary chart, marked in increasing arithmetical progression from left to right, the left-hand space of each secondary chart being marked to indicate its corresponding right-hand space of the primary chart, and means on each secondary chart for indicating the information given in the right-hand series of the primary chart, substantially as described.

2. An improved ancestry-record, comprising a primary chart provided with a plurality of series of spaces the number of spaces in the different series increasing in geometrical progression from left to right and marked consecutively by numerals increasing in arithmetical progression from left to right to indicate the generation to be recorded in each series, and a series of secondary charts in number corresponding to the number of spaces in the right-hand series of the primary chart, the secondary charts having spaces arranged the same as on the primary charts, marked in increasing arithmetical progression from left to right, the left-hand space of each secondary chart being marked the same as the right-hand series of the primary chart, the secondary charts having on their reverse sides indices, each having a series of spaces in number and arrangement corresponding with the right-hand series of spaces on the primary chart, for indicating the name to occupy the first space on the left of each secondary chart, substantially as described.

GEORGIANA GUILD.

Witnesses:
WALTER B. VINCENT,
AUGUSTA P. FREDERICK.